April 24, 1951  H. L. RORDEN  2,549,853
LIGHTNING PROTECTION FOR TRANSMISSION LINES
Original Filed March 19, 1945
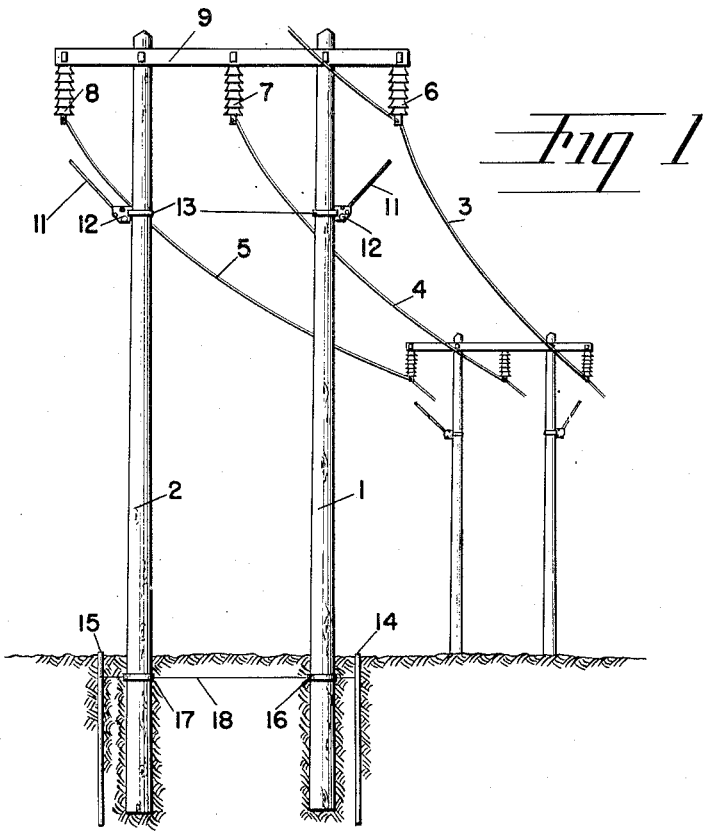
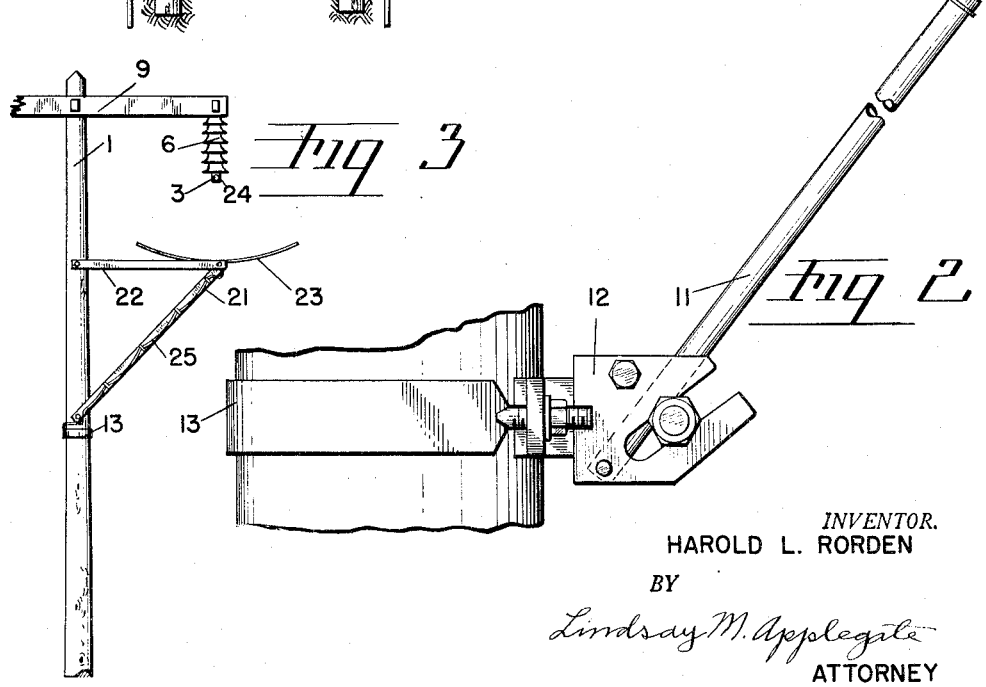
INVENTOR.
HAROLD L. RORDEN
BY
Lindsay M. Applegate
ATTORNEY Patented Apr. 24, 1951

2,549,853

UNITED STATES PATENT OFFICE 2,549,853

LIGHTNING PROTECTION FOR TRANSMISSION LINES

Harold L. Rorden, Portland, Oreg., assignor to the United States of America as represented by the Secretary of the Interior Original application March 19, 1945, Serial No. 583,483. Divided and this application April 7, 1950, Serial No. 155,779

8 Claims. (Cl. 175—30)

(Granted under the act of March 3, 1883, as amended April 30, 1928; 370 O. G. 757)

The invention described herein may be manufactured and used by or for the Government of the United States for governmental purposes without the payment of any royalty thereon in accordance with the provisions of the act of March 3, 1883, (22 Stat. 625), as amended by the act of April 30, 1928, (45 Stat. 467, 35 U. S. C., 1946 Ed. Sec. 45).

This invention is a division of my application for Patent Number 583,483 filed March 19, 1945, now abandoned, for Lightning Protection for Transmission Lines. This division includes only those parts of the original application shown in Figures 2 and 3, together with parts of Figure 1 thereof. Thus, this division pertains only to the protection of wood pole transmission lines.

In the protection of wood pole transmission lines it has long been conventional to discharge lightning to ground by grounded conductors reaching from the top, or parts of the pole near the top, to the ground. Such conductors are usually of sufficient carrying capacity to discharge lightning and also to carry substantial power currents in case of arcing from line to the ground wire. There has been at least one attempt in the prior art to discharge lightning through electrolyte-filled tubes connected from ground to regions near the conductors. In my original application I showed fusible wires which were in some respects the equivalent electrically of the tubes of electrolyte of the prior art. In other inventions of the prior art there have been various arrangements of conductors intended to conduct lightning to ground and to prevent the lightning from discharging along or through the wooden pole itself. In my present invention, I use none of these devices and I make no attempt whatever to keep the lightning away from the pole.

In the electrolyte tube of the prior art, it was the intention of the inventor to discharge lightning but to build up sufficient resistance in the electrolyte tubes to prevent power current from following after the lightning discharge. I have found experimentally that, on ordinary heights of wooden poles used for 110,000-volt lines, if a fusible path of a length comparable with the usual height of the conductors for ground is provided for the lightning, usually no power current will follow if the path after the lightning has passed contains no actual conductor. This has established the physical fact that although lightning can easily be discharged over a spark gap of any practical length such as 50 or 100 feet, or more, the power current will not follow the lightning if the spark gap has a length of about one foot for each 2,000 volts of line to ground voltage.

It has long been known in the prior art that lightning in being discharged down trees and poles, often cuts grooves in the side of the wood structure, and occasionally splits the tree or pole. This has brought out several inventions of the prior art intended to carry either or both lightning and power currents to ground while keeping the discharge from damaging the wooden pole. I have found from my observations that, at least in some localities, lightning can be discharged down ordinary large wooden poles without doing any more damage than that of a groove from one to three or four inches wide and about an inch in depth. The ordinary large pole can sustain several such grooves without impairment of its usefulness. Occasionally but rarely a pole will be so severely damaged as to require replacement.

I have found also in my observations that, on poles which are protected by ground conductors or by by-passing arrangements, lightning discharges are frequently, if not almost always, followed by power currents to ground. These power currents almost invariably cause an interruption in the continuity of service of the line. The protective relays are necessarily set to respond to ground fault currents and consequently they take the line out of service at the occurrence of each lightning discharge which is followed by power current. The interruption of service on lines carrying heavy loads is much more seriously objectionable than would be any damage to the pole short of mechanical failure. Poles which are not protected by grounded or by-passing arrangements, can discharge lightning without ground power current following, but lightning on such poles often causes flashover of power current between adjacent conductors. This, like grounded faults, also takes the line out of service with all the undesirable consequences of power flow interruption.

In my observations of lightning on power transmission lines, especially those in which three conductors are suspended in a horizontal plane, I have found that the lightning often strikes the outside conductor but rarely if ever strikes the middle conductor. Accordingly I have found that if the lightning is discharged to ground from an outside conductor, the other conductors are rarely disturbed. On the other hand, if lightning strikes an outer conductor and is not discharged directly to ground, a lightning flash to the middle conductor is a usual consequence. Such a discharge usually is followed by a power arc with a line outage.

The principal object of this invention is to protect wood-pole transmission lines from service interruptions due to lightning. Another object is to provide such protection with a minimum of cost and a minimum of material. Yet another object is to utilize the pole itself to the maximum practical degree for protecting the line from interruption. These objects are dependent on another object, that of discharging lightning to ground without permitting a flow of power current to follow the lightning discharge. Another object, of course, is to accomplish the discharge of lightning without objectionable damage to the supporting structure. What constitutes my invention is set forth in the specification following with reference to the accompanying drawing and is succinctly defined in the appended claims.

The drawing comprises three figures:

Figure 1 is a general view of a typical span of three-phase power transmission line showing my invention in one practical form of embodiment.

Figure 2 is a detail of my invention showing the mechanical attachment thereof to a typical wooden pole.

Figure 3 shows an alternative embodiment of my invention in which the principle of operation is basically the same as for the embodiment shown in Figure 1.

In Figure 1, a wood pole 1 together with a similar pole 2 are shown in a conventional two-pole transmission line structure. The structure supports three conductors 3, 4, and 5 of a conventional three-phase power line. The conductors are supported by three conventional insulators 6, 7, and 8 suspended from the usual crossarm 9. The two-pole structure shown in Figure 1 is referred to as "H-frame" construction.

On each pole, 1 and 2, there is attached a projecting rod 11 supported by a bracket 12 which is anchored to the pole by a clamping ring 13. I refer for convenience and brevity, especially in claims, to the combination of rod 11 and the bracket 12 extending toward conductor 3 as a "bracket-like member," or simply as a "bracket."

A ground rod 14 is driven near the base of pole 1. A similar rod 15 is driven near pole 2. On pole 1 a ring 16 and on pole 2 a ring 17 connected by a conductor 18 may also, if desired, be provided.

Figure 2 shows rod 11, bracket 12 and ring 13 in more detail, bracket 12 in Figure 2 is one practical form which provides for adjustment but this is illustrative only of one practical way of supporting rod 11. Any other convenient bracket is suitable.

Figure 3 is electrically equivalent to the arrangement shown in Figure 1, but instead of rod 11, a bracket 21 is used. A horizontal bracing member 22 provides additional support. A conducting member 23 is bent to a radius such that the conductor clamp 24 maintains uniform distance from member 23 when the conductor sways in the wind. This curved member 23 is sometimes a convenience but it is not an essential element of my invention. As in Figure 1, I refer for convenience and brevity to the combination of bracket 21 and conductor 23 as a "bracket-like member," or as a "bracket."

Member 21 usually is paralleled by a conductor 25 connected between member 23 and ring 13. This however is not absolutely essential. Even when both members 22 and 25 are made of wood, the bracket alone is effective although to a lesser degree than where the conductor 25 is present.

In the operation of my invention, as shown in Figure 1, there is under normal conditions an alternating difference of potential of the power system frequency between the conductor 3 and the upper end of rod 11. The air between the rod 11 and conductor 3 can be considered to be a practically perfect insulator. The pole 1 when thoroughly dry is a good insulator but not as good as dry air. Even the driest of wood usually contains some free moisture and has a measurable conductivity. There is an alternating electrostatic field between conductor 3 and rod 11 which requires a spacing in air of about the length of the insulator string 6, supporting the conductor, to avoid objectionable corona on the line suspension clamps on the end of rod 11.

When lightning strikes the line it is almost invariable that either conductor 3 or conductor 5 is struck; practically never conductor 4. The lightning produces an increased difference of potential between line 3 and the outer end of rod 11, easily flashing over and discharging to ground. The outer end of rod 11 is referred to for convenience as an "air electrode." The lightning produces a field also over the string of insulators 6 and from conductor 3 to conductor 4 and to the nearby parts of the wooden structure. Lightning, however, is produced by a vertical electric field of large dimensions and the lightning discharge has a tendency to travel in vertical lines parallel to the lines of electric force in the field. Consequently the construction shown in Figure 1 will in practically all cases lead the lightning down the pole 1 from ring 13.

If ring 13 were connected by a conductor such as an ordinary ground wire to ground, the lightning on conductor 3 would be discharged to ground in exactly the same way as just described, but the lightning discharge would be followed by a power arc that would be sustained until the power voltage could be removed from the line. This follows from the practical condition that a power arc will usually be maintained over a gap of the length of the ordinary insulator string by the voltage appropriate to the string. To prevent a power arc the gap needs to be, for example, about 30 feet for the ground-to-neutral voltage of 66,000 in a 110,000-volt three-phase line. This is about the height at which ring 13 is conveniently attached to the ordinary 110,000-volt line pole. In the arrangement shown in Figure 1 which is approximately to scale, lightning on either outside conductor will jump the gaps from the conductor to the rod 11 and from ring 13 to ground. The excess charge on the line will be carried to ground immediately. During the lightning discharge power current will flow to ground through the highly ionized path of the lightning discharge but when the high potential difference produced by the lightning has been dissipated, the line voltage to ground is insufficient to maintain a current over so long a path. The lightning is characterized by differences of potential of millions of volts and consequently discharges over distances compared with which 30 or 40 feet is negligible. The line voltages being always a fraction of a million volts are incapable of maintaining power arcs under most conditions of the length of the ordinary wood pole.

The lightning discharge from ring 13 to the ground usually gouges the pole making a groove from one to four inches wide and about an inch deep. Many such gouges on the same pole might damage the pole so it would have to be replaced, but I have found that only about one percent of the poles which have discharged lightning with my invention are damaged to the extent that replacement is needed. This slight pole damage, characteristic of the operation of my invention, is due in part to the use of a clamping ring 13 for supporting rod 11 instead of the kind of bracket that requires bolts or lag screws in or through the pole as shown in Figure 3. Ring 13 provides electrode surface entirely around the circumference of pole 1 to permit the lightning to follow any streak down the surface of the pole where moisture or other causes might result in conductivity higher than on other parts of the pole. This avoids the danger of leading the lightning to the interior of the pole where, if there is moisture inside, it may cause splitting or shattering of the entire pole.

I claim:

1. In combination with a conductor, an insulator and a wooden supporting structure in an electric power transmission line, an ungrounded bracket-like member attached to said structure, said member extending toward said conductor to provide an airgap between said conductor and said member for carrying lightning to an insulated path on the surface of said wooden structure to ground away from said insulator.

2. In combination with a conductor, an insulator and a wooden supporting structure in an electric power transmission line, an ungrounded bracket-like member attached to said structure, said member extending toward said conductor to provide an airgap between said conductor and said member, said airgap having a length approximating the over-all dimensions of said insulator and situated to conduct lightning discharges to an insulated path on the surface of said wooden structure to ground away from said insulator.

3. In combination with a conductor, a suspension insulator and a wooden supporting structure in an electric power transmission line, an ungrounded bracket-like member attached to said structure below said insulator and conductor and above the ground to provide an insulated path to ground on the surface of said wooden structure said member extending from said structure toward said conductor to provide an airgap between said conductor and said member.

4. In combination with a conductor, a suspension insulator and a wooden supporting structure in an electric power transmission line, an ungrounded conducting bracket-like member attached to said structure below said insulator and conductor and above the ground to provide an insulated path on the surface of said wooden structure below said member, said member extending from said structure toward said conductor to provide an airgap between said conductor and said member.

5. In combination with a conductor, an insulator and a wooden supporting structure in an electric power transmission line, an ungrounded bracket-like member and a conducting ring fastened around said wooden structure at the approximate elevation of said member, said member extending from said structure toward said conductor to provide an airgap between said conductor and said member said wooden structure below said ring being clear of the ground and any conductor thereon for a distance below said ring of the order of one foot or more for each 5000 volts of normal line-to-ground operating voltage.

6. In combination with a conductor, an insulator and a wooden supporting structure in an electric power transmission line, an ungrounded conducting bracket-like member and a conducting ring fastened around said structure at the approximate elevation of said member, said member extending from said structure toward said conductor to provide an airgap between said conductor and said member.

7. In combination with a conductor, a suspension insulator and a wooden supporting pole in an electric power transmission line, an ungrounded conducting bracket-like member and a conducting ring connected to said member, said member being attached to said pole below the elevation of said conductor, and said ring fastened around said pole below said member, said member extending from said pole toward said conductor to provide an airgap between said conductor and said member said pole below said ring being clear of the ground and of any conductor thereon for a distance of the order of one foot for each 5000 volts of normal line-to-ground operating voltage.

8. In combination with three conductors, three suspension insulators, a horizontal crossarm and two wooden poles in an H-frame-supported electric power transmission line, said conductors being horizontally arranged so an inside conductor is suspended between the two poles and one outside conductor is suspended outside each pole in the H-frame, an ungrounded conducting bracket attached to the outside of each pole below the elevation of said conductors, and a conducting band connected to said member and fastened around said pole slightly below the said member, said members extending from said poles toward said outside conductors to provide airgaps between said outside conductors and said members, said airgaps having lengths approximating the length of said suspension insulators said poles below said bands being clear of the ground and of any conductor thereon for a distance of the order of one foot for each 5000 volts of normal line-to-ground operating voltage.

HAROLD L. RORDEN.

REFERENCES CITED

The following references are of record in the file of this patent:

UNITED STATES PATENTS

| Number | Name | Date |
| --- | --- | --- |
| 1,863,080 | Austin | June 14, 1932 |
| 1,928,820 | Pittman | Oct. 3, 1933 |
| 2,394,937 | Pittman | Feb. 12, 1946 |